United States Patent
Ta et al.

(10) Patent No.: US 7,339,346 B2
(45) Date of Patent: Mar. 4, 2008

(54) MOTOR AND DRIVE CONTROL DEVICE THEREFOR

(75) Inventors: CaoMinh Ta, Gunma (JP); Shuji Endo, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/536,990

(22) PCT Filed: Nov. 27, 2003

(86) PCT No.: PCT/JP03/15166

§ 371 (c)(1),
(2), (4) Date: May 31, 2005

(87) PCT Pub. No.: WO2004/049554

PCT Pub. Date: Jun. 10, 2004

(65) Prior Publication Data
US 2006/0071628 A1    Apr. 6, 2006

(30) Foreign Application Priority Data

| Nov. 28, 2002 | (JP) | ............................. 2002-345135 |
| Dec. 6, 2002 | (JP) | ............................. 2002-354632 |
| Nov. 6, 2003 | (JP) | ............................. 2003-376428 |

(51) Int. Cl.
*H02P 23/00* (2006.01)

(52) U.S. Cl. ...................... 318/807; 318/808; 318/825; 318/727

(58) Field of Classification Search ..................... None
See application file for complete search history.

(56) References Cited

U.S. PATENT DOCUMENTS

| 5,656,911 | A |   | 8/1997 | Nakayama et al. |
| 5,677,605 | A |   | 10/1997 | Cambier et al. |
| 5,701,066 | A |   | 12/1997 | Matsuura et al. |
| 6,242,885 | B1 | * | 6/2001 | Ide et al. ..................... 318/811 |
| 6,329,781 | B1 |   | 12/2001 | Matsui et al. |
| 6,344,726 | B1 | * | 2/2002 | Tobari et al. ................ 318/727 |
| 6,362,586 | B1 |   | 3/2002 | Naidu |
| 6,504,336 | B2 | * | 1/2003 | Sakamaki ..................... 318/727 |
| 6,518,718 | B2 | * | 2/2003 | Koga et al. .................... 318/38 |
| 6,670,786 | B2 | * | 12/2003 | Tobari et al. ................ 318/805 |
| 7,076,340 | B1 | * | 7/2006 | Inazumi et al. .............. 700/298 |
| 2002/0113615 | A1 | * | 8/2002 | Atarashi ...................... 324/772 |

FOREIGN PATENT DOCUMENTS

| JP | 11-18471 A | 1/1999 |
| JP | 2000-279000 A | 10/2000 |
| JP | 2000-287481 A | 10/2000 |
| JP | 2000-350487 A | 12/2000 |
| JP | 2001-18822 A | 1/2001 |
| JP | 3298006 B2 | 4/2002 |

\* cited by examiner

*Primary Examiner*—Lincoln Donovan
*Assistant Examiner*—Renata McCloud
(74) *Attorney, Agent, or Firm*—Sughrue Mion, PLLC (57) ABSTRACT

The invention provides a motor for a brushless DC motor, which has small torque ripple even if a trapezoidal wave current is supplied and has a small size and reduced motor noise, and a drive control device for the motor as well as an electric power steering apparatus using the motor and the drive control device. Respective phase current command values are calculated on the basis of vector control. Pseudo-vector control for controlling respective phases separately is used as current feedback control.

10 Claims, 10 Drawing Sheets

MOTOR AND DRIVE CONTROL DEVICE THEREFOR

TECHNICAL FIELD

The present invention relates to improvement of a motor, which is most suitable for use in an electric power steering apparatus, and a drive control device for the motor as well as an electric power steering apparatus using the motor and the drive control device.

BACKGROUND ART

Conventionally, a motor used in an electric power steering apparatus is, in general, a permanent magnet synchronous motor (PMSM), which is driven by a three-phase sinusoidal current. As a control system for driving the motor, a control system called vector control is widely used. However, since there is a strong demand for a reduction in size of the electric power steering apparatus, a brushless DC motor tends to be used as a motor suitable for the reduction in size.

Under such circumstances, a motor drive control device using the advance angle control system for the conventional motor for the electric power steering apparatus will be explained with reference to FIG. 1.

In a structure of the motor drive control device, a main path leading to the motor 1 is connected to the back of a current command value calculating unit 100 that controls an electric current of a motor 1 via subtracters 20-1, 20-2, and 20-3 that detect errors between phase current command values Iavref, Ibvref, and Icvref and motor currents Ia, Ib, and Ic, a PI control unit 21 that inputs respective error signals from the subtracters 20-1, 20-2, and 20-3, a PWM control unit 30 that inputs voltages va, vb, and vc from the PI control unit 21, and an inverter 31 that converts a direct current into an alternating current. Current detecting circuits b 32-1, 32-2, and 32-3, which detect the motor currents Ia, Ib, and Ic, are arranged between the inverter 31 and the motor 1. A feedback control system B, in which the detected motor currents Ia, Ib, and Ic are fed back to the subtracters 20-1, 20-2, and 20-3, respectively, is formed.

Next, the current command value calculating unit 100 will be explained. First, concerning inputs thereof, a torque command value Tref calculated from a torque detected by a not-shown torque sensor, a rotation angle θe of a rotor in the motor 1 detected by a position detecting sensor 11 connected to the motor 1, and an electrical angular velocity we calculated by a differentiating circuit 24 are inputted. A converting unit 101 calculates counter-electromotive forces ea, eb, and ec with the electrical angular velocity we and the rotation angle θe of the rotor as inputs. Next, a three-phase/two-phase converting unit 102 converts the counter-electromotive forces ea, eb, and ec into a d-axis component voltage ed and a q-axis component voltage eq. A q-axis command current calculating unit 108 calculates a current command value on a q-axis Iqref with the d-axis component voltage ed and the q-axis component voltage eq as inputs. However, in this case, a current command value on a d-axis Idref is calculated as 0. In other words, in the following output equation of a motor, $$Tref \times \omega m = 3/2(ed \times Id + eq \times Iq) \quad (1)$$

when Id =Idref=0 is inputted, the equation is calculated as follows.

$$Iq = Iqref = 2/3(Tref \times \omega m / eq) \quad (2)$$

Phase current command values Iavref, Ibvref, and Icvref are calculated on the basis of a current command value Iqref from the q-axis command current calculating unit 108 and an advance angle Φ of advance angle control described later. In other words, a two-phase/three-phase converting unit 109 calculates the phase current command values Iavref, Ibvref, and Icvref based on the advance angle Φ calculated in the advance angle calculating unit 107 and the current command value Iqref calculated in the q-axis command current calculating unit 108.

Figure 2:
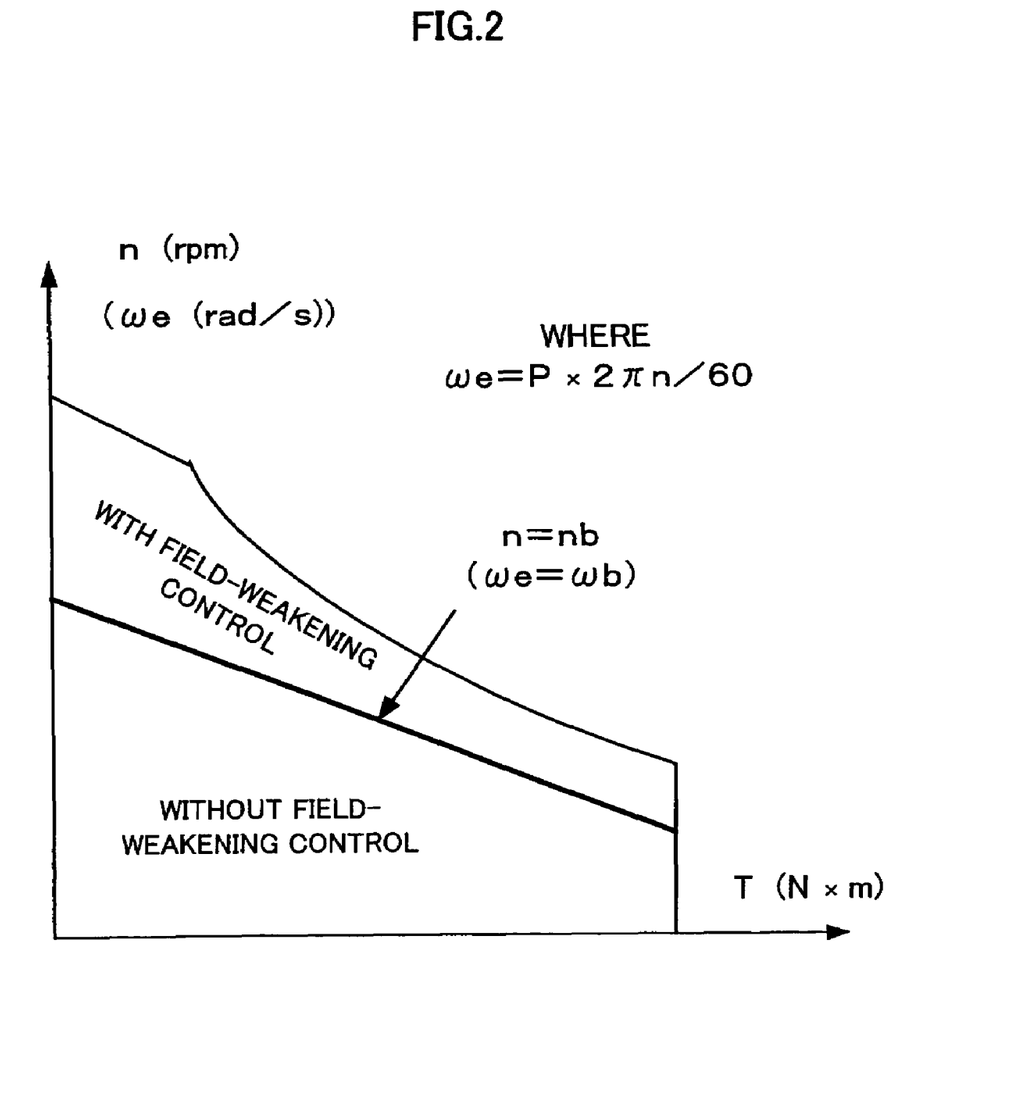
FIG. 2 is a graph showing a base angular velocity that is a limit angular velocity in the case in which field-weakening control is not used.

Note that a function such as Φ=a cos(ωb/ωm) or Φ=K (1−(ωb/ωm)) is used empirically ("a cos" represents $\cos^{-1}$). In addition, a motor base angular velocity ωb is a motor limit angular velocity at the time when the motor 1 is driven without using field-weakening control. FIG. 2 shows a relation between a torque T and a motor speed n (the angular velocity ωe) and shows an example of the limit angular velocity ωb in the case in which there is no field-weakening control.

Next, the advance angle control will be explained.

While the motor 1 is not rotating at high speed, that is, while a mechanical angular velocity ωm of the motor 1 is lower than the motor base angular velocity ωb, it is possible to output a torque complying with the torque command value Tref if the phase current command values Iavref, Ibvref, and Icvref in accordance with a value calculated from the current command value Iqref by the two-phase/three-phase converting unit 109 regardless of the advance angle Φ. This means that, as the electric power steering device, wheel operation by a driver is executed smoothly.

However, when the motor 1 rotates at high speed, that is, the mechanical angular velocity ωm of the motor is higher than the motor base angular velocity ωb, an angular velocity higher than the base angular velocity ωb cannot be realized unless control taking into account the advance angle Φ is executed. When this high-speed rotation of the motor 1 is considered from a viewpoint of the electric power steering apparatus, in the case of sudden steering of a wheel for turn in parking a car or emergency shelter, steering feeling of the driver is deteriorated because the motor 1 does not follow the wheel operation.

Figure 10:
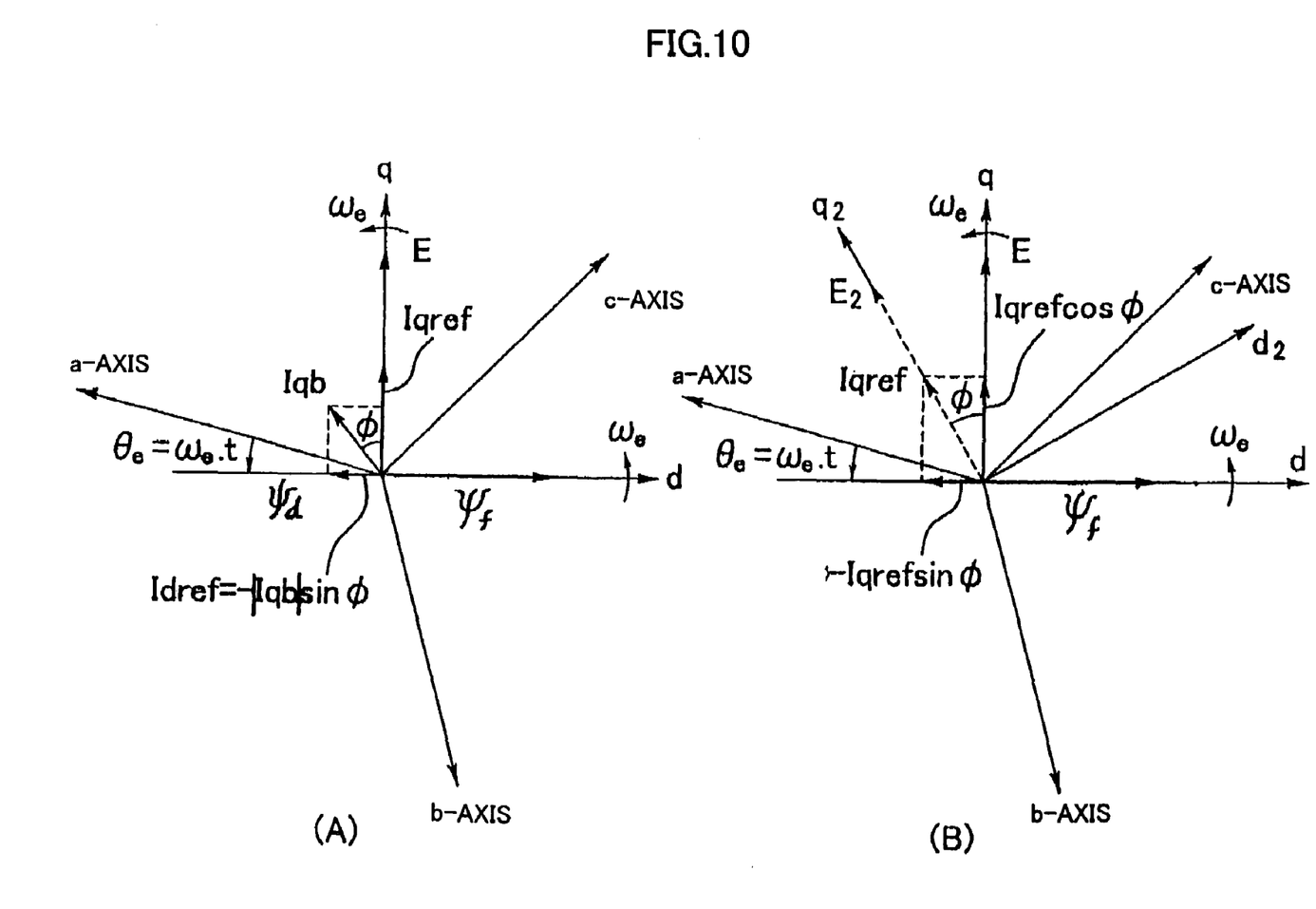
FIG. 10 is a diagram showing a vector relation between current command values Idref and Iqref according to a control system of the invention and a conventional advance angle control system.

There is a control system called field-weakening control as torque control at the time of high-speed rotation of a motor. There is advance angle control as a specific method of the field-weakening control. Details of this advance angle control system are described in U.S. Pat. No. 5,677,605 (C1) and C. C. Chan et al "Novel Permanent Magnet Motor Drivers for Electric Vehicles" IEEE Transaction on Industrial electronics (Vol 43, No. 2 Apr. 1996, page 335, FIG. 5). A characteristic of the advance angle control system is to advance a phase of the current command value Iqref by the angle Φ to create a field-weakening component. In FIG. 10(B), when the current command value Iqref is advanced by the angle Φ, Iqref×sin Φ is generated as a d-axis component and Iqref×cos Φ is generated as a q-axis component. Here, Iqref×sin Φ acts as a field-weakening component and Iqref×cos Φ acts as a torque component.

As a motor drive control system used in the electric power steering apparatus, vector control, which is adapted to generate a rotating magnetic field from a control device via an inverter on the basis of rotating position of a rotor to control to drive rotation of the rotor, is adopted. In other words, the vector control is adapted to, in plural exciting coils arranged at intervals of a predetermined angle on an outer peripheral surface of the rotor, control rotation drive for the rotor by sequentially switching excitation of the respective exciting coils using a control circuit according to a rotor position.

Figure 3:
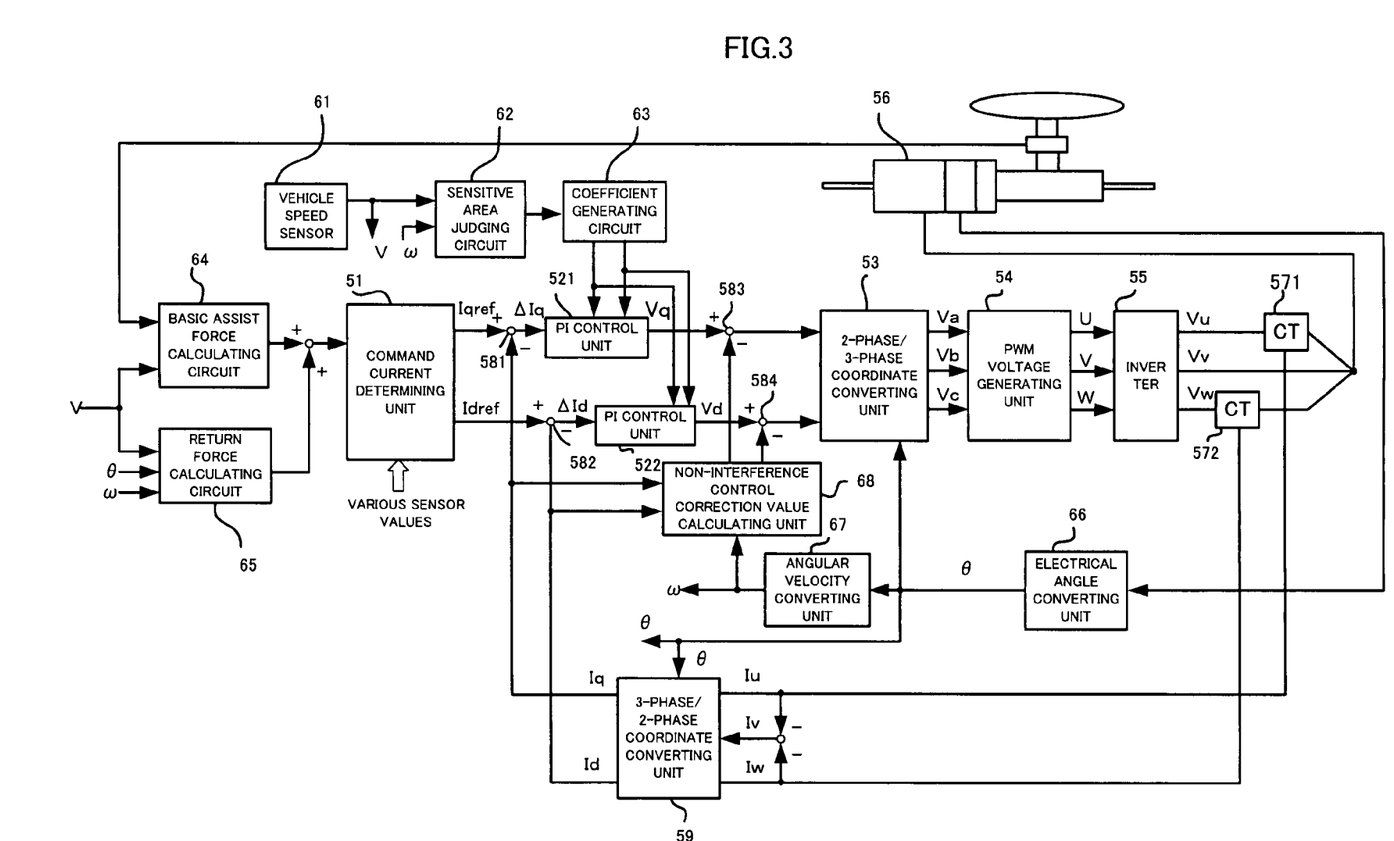
FIG. 3 is a block diagram showing a control system of conventional vector control.

This type of vector control is disclosed in, for example, JP-A-2001-18822. FIG. 3 is a block diagram showing an example of drive control for a motor 56 according to the vector control.

In FIG. 3, a main path of a command signal leading to the motor 56 from a command current determining unit 51, which determines a control command value of the motor 56, via a PI control unit 52, a two-phase/three-phase coordinate converting unit 53, a PWM voltage generating unit 54, and an inverter 55 is formed. Current sensors 571 and 572 are arranged between the inverter 55 and the motor 56. A feedback path, in which a three-phase/two-phase coordinate converting unit 59 converts a motor current detected by the current sensors 571 and 572 into a two-phase current to feed back two-phase current components Iq and Id to subtracting circuits 581 and 582 arranged between the command current determining unit 51 and the PI control unit 52, is formed.

With this control system, the command current determining unit 51 receives the torque command value Tref calculated from a torque detected by the torque sensor and a rotor rotating angle θ and an electrical angle ω detected by the position detecting sensor to determine current command values Idref and Iqref. These current command values Idref and Iqref are subjected to feedback correction by the two-phase current components Iq and Id, which are converted into two phases by the three-phase/two-phase coordinate converting unit 59 in the feedback pass, in the subtracting circuits 581 and 582, respectively. In other words, the subtracting circuits 581 and 582 calculate errors between the two-phase current components Id and Iq and the current command values Idref and Iqref. Thereafter, PI control units 521 and 522 calculate signals, which indicate duty of PWM control, as command values Vd and Vq in forms of a d component and a q component. The two-phase/three-phase coordinate converting unit 53 inversely converts the d component and the q component into three-phase components Va, Vb, and Vc. The inverter 55 is subjected to the PWM control on the basis of the three-phase command values Va, Vb, and Vc and an inverter current is supplied to the motor 56 to control rotation of the motor 56.

Note that reference numeral 61 denotes a vehicle speed sensor; 62, a sensitive are a judging circuit; 63, a coefficient generating circuit; 64, a basic assist force calculating circuit; 65, a return force calculating circuit; 66, an electrical angle converting unit; 67, an angular velocity converting unit; and 68, a non-interference control correction value calculating unit.

In the case of the vector control described above, the current command values Idref and Iqref are determined on the basis of the torque command value Tref, the electrical angle ω, and the rotation angle θ. Feedback currents Iu and Iw of the motor 56 are converted into three-phase currents Iu, Iv, and Iw and, then, converted into two-phase current components Id and Iq. Thereafter, the subtracting circuits 582 and 581 calculate errors between the two-phase current components Id and Iq and the current command values Idref and Iqref. Current control by the PI control is executed according to the errors, whereby command values Vd and Vq to the inverter 55 are calculated. Then, the two-phase/three-phase coordinate converting unit 53 inversely converts the command values Vd and Vq into the three-phase command values Va, Vb, and Vc, whereby the inverter 55 is controlled to perform drive control for the motor 56.

Incidentally, the d-axis component and the q-axis component generated by the advance angle control simply advance the current command value Iqref by the phase Φ. Thus, Iqref×sin Φ on the d-axis and Iqref×cos Φ on the q-axis are restricted to a fixed relation and a quantitative balance is not always optimized. As a result, a motor terminal voltage is saturated at the time of high-speed rotation and a motor current cannot follow a current command value, whereby torque ripple increases and motor noise also increases. Therefore, as the electric power steering apparatus, inconveniences are caused in that, for example, a driver feels abnormal vibration through a wheel at the time of rapid wheel steering and motor noise is cased to give unpleasant feeling to the driver.

In the case of the vector control described above, a detection current of the motor 56 and an output of the inverter 55 are in three phases and the feedback control system is in two phases. It is necessary to control to drive the motor 56 by inversely converting two phases into three phases in the two-phase/three-phase coordinate converting unit 53 in this way. Thus, there is a problem in that the entire control system is complicated because the two-phase/three-phase conversion and the three-phase/two-phase conversion are mixed.

In the control of the motor 56, if it is possible to maintain linearity of the control system, control responsiveness is improved. Thus, the control is easy and a control target is easily attained. However, various nonlinear factors are included in drive control for the motor 56. As a factor causing nonlinearity of motor drive, for example, there is dead time of inverter control. Although an FET is used as a switching element of an inverter, the FET is not an ideal switching element. In order to prevent short circuit in upper and lower arms, a period for setting both FETs of the upper and lower arms in an off state (dead time) is provided. A nonlinear element of a switching transition state is included in a motor current generated by switching of the FETs having such dead time. In addition, a nonlinear element is also included in a detection element, a detecting circuit, and the like for detecting a motor current.

As a result, for example, a nonlinear element generated in an a-phase current Ia is included in the d-axis current component Id and the q-axis current component Iq by the d-q conversion in the three-phase/two-phase coordinate converting unit 59 of the feedback system. Therefore, current control is performed on the basis of the current components Id and Iq, the command values Vd and Vq from the PI control units 522 and 521 to the inverter 55 are calculated, a d-phase and a q-phase are inversely converted into an a-phase, a b-phase, and a c-phase in the two-phase/three-phase coordinate converting unit 53, and three-phase command values Va, Vb, and Vc are calculated. Consequently, the nonlinear element originally included in the a-phase current Ia is diffused to the command values Va, Vb, and Vc of the inverter 55 by the d-q conversion. Thus, the nonlinear element is included in the command values of not only the a-phase but also the b-phase and the c-phase. In other words, in the case of the conventional control system, despite the fact that the motor is driven in three phases, feedback current control is calculated in two phases and the command values Vd and Vq determined in two phases are converted into the three-phase command values Va, Vb, and Vc formally and controlled. Thus, the nonlinear element is diffused.

Therefore, according to the conventional motor control, there is a problem in that torque ripple is large and noise of the motor is also large. When such motor control is applied to the electric power steering apparatus, the electric power steering apparatus cannot assist steering accurately and smoothly following wheel operation. Thus, there is a problem in that a driver feels vibration at the time of steering and noise increases.

The invention has been devised because of the circumstances described above and it is an object of the invention to provide a motor and a drive control device for the motor, in which torque ripple is reduced and noise is reduced by controlling nonlinear elements included in motor control in a state in which the nonlinear elements are separated into respective phases, and also provides an electric power steering apparatus that adopts the motor and the drive control device to have an improved steering performance and satisfactory steering feeling.

It is another object of the invention to provide a motor drive control device, in which a motor terminal voltage is not saturated even at the time of high-speed rotation of a motor, torque ripple is reduced and motor noise is reduced, and an electric power steering apparatus in which noise is reduced at the time of rapid steering of a wheel and with which wheel operation can follow the steering smoothly.

DISCLOSURE OF THE INVENTION

The invention relates to a motor and the above-described object of the invention is attained by, when an induced voltage waveform is a rectangular waveform of a motor or a pseudo-rectangular waveform and an order wave component at the time when the rectangular waveform or the pseudo-rectangular waveform is subjected to frequency analysis is assumed to be n(=2, 3, 4, ... ), setting the order wave component n equal to or larger than 5% of an amplitude component to satisfy the following inequality:

$n \times P/2 \times \omega \leq$ an upper limit value of a response frequency of current control where P is the number of poles and $\omega$ is the number of actual rotation.

The invention relates to a motor drive control device that controls a motor having three or more phases. The motor drive control device has a vector control phase current command value calculating unit that calculates phase current command values of the respective phases of the motor using vector control, a motor current detecting circuit that detects motor phase currents of the respective phases of the motor, and a current control unit that controls phase currents of the motor on the basis of the phase current command values and the motor phase currents, whereby the object of the invention is attained. In addition, the vector control phase current command value calculating unit has a counter-electromotive force of each phase calculating unit that calculates a counter-electromotive force of each phase, a d-q voltage calculating unit that calculates voltages ed and eq, which are d-axis and q-axis components of a counter-electromotive force, from the counter-electromotive force of each phase, a q-axis command current calculating unit that calculates a current command value Iqref, which is a q-axis component of a current command value, from the voltages ed and eq, a d-axis command current calculating unit that calculates a current command value Idref that is a d-axis component of a current command value, and an each-phase current command calculating unit that calculates phase current command values of the respective phases from the current command values Iqref and Idref, whereby the object of the invention is attained. Further, when the motor has three phases, phase current command values Iavref, Ibvref, and Icvref are calculated according to a constant depending on the current command values Idref and Iqref and a rotation angle θe of the motor, whereby the object of the invention is attained.

The current control circuit includes integral control, the motor is a brushless DC motor, a current of the motor is a rectangular wave or a pseudo-rectangular wave, or the motor drive control device is used in an electric power steering apparatus, whereby the object of the invention is attained more effectively.

Moreover, the invention relates to a motor drive control device that controls a current of a motor on the basis of current command values Idref and Iqref, which are calculated using vector control. When a detected mechanical angular velocity ωm of the motor is higher than a base angular velocity ωb of the motor, the current command value Idref is calculated according to a torque command value Tref of the motor, the base angular velocity ωb, and the mechanical angular velocity ωm, whereby the object of the invention is attained.

The current command value Idref is calculated according to the torque command value Tref and a function of sin Φ and an advance angle Φ is derived from the base angular velocity ωb and the mechanical angular velocity ωm, the current command value Iqref is calculated by substituting the current command value Idref in a motor output equation, or a motor current of the brushless DC motor is a rectangular wave current or a pseudo-rectangular wave current, whereby the object of the invention is attained more effectively.

BEST MODE FOR CARRYING OUT THE INVENTION

An embodiment of the invention will be explained with reference to the drawings.

In this embodiment, a three-phase brushless DC motor will be explained. However, the invention is not limited to this and can also be applied to other motors.

Figure 4:
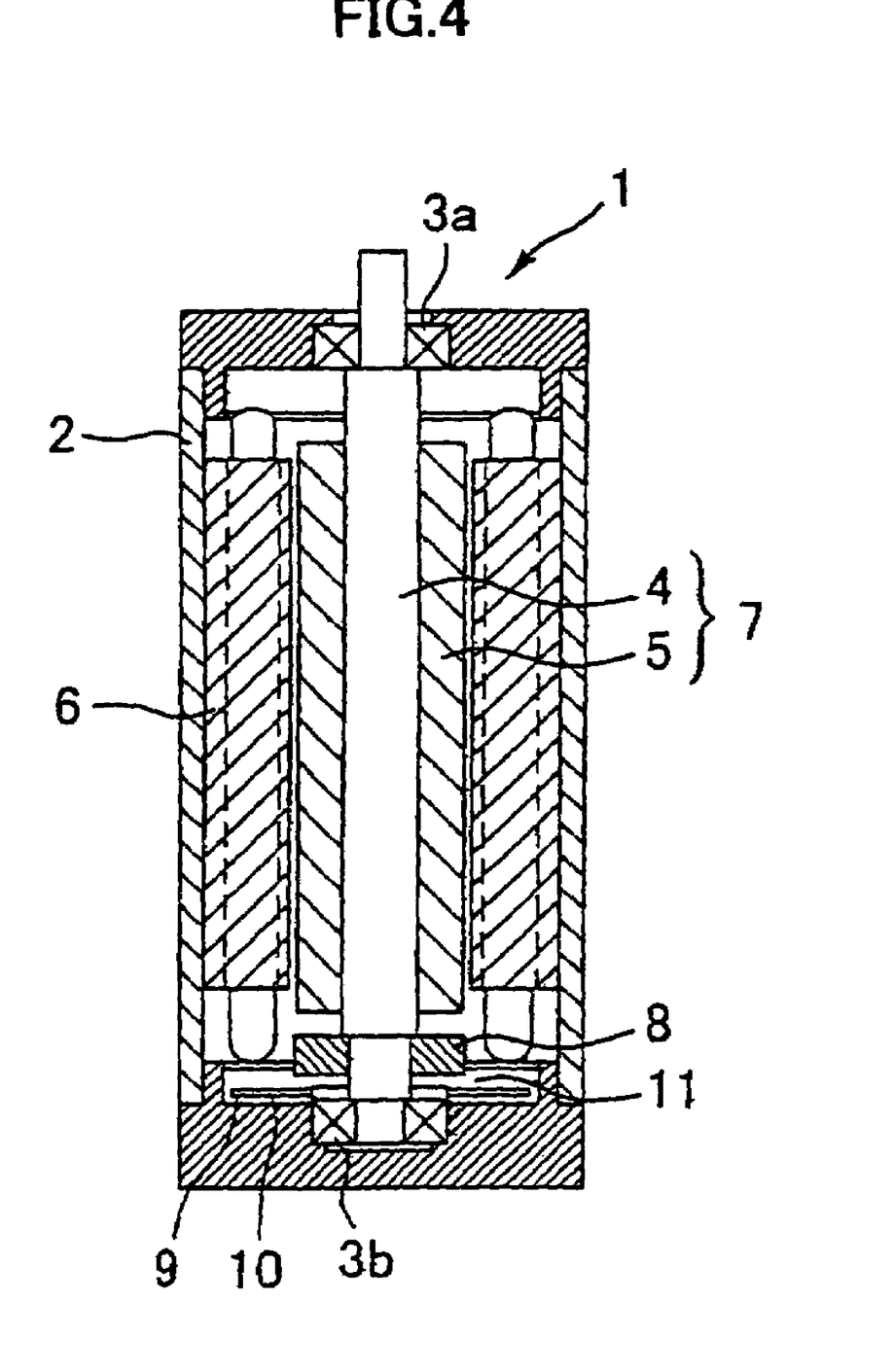
FIG. 4 is a sectional structure diagram showing an example of a brushless DC motor that is a control object of the invention.

As shown in FIG. 4, a three-phase brushless DC motor 1 according to the invention includes a cylindrical housing 2, a rotating shaft 4 that is disposed along an axis of this housing 2 and supported to rotate freely by bearings 3a and 3b at upper lower ends thereof, a permanent magnet 5 for motor drive fixed to this rotating shaft 4, and a stator 6 that is fixed to an inner peripheral surface of the housing 2 to surround this permanent magnet 5 and wound with three-phase excitation coils 6a, 6b, and 6c. A rotor 7 is constituted by the rotating shaft 4 and the permanent magnet 5. A ring-shaped permanent magnet 8 for phase detection is fixed near an end of the rotating shaft 4 of this rotor 7. This permanent magnet 8 is polarized in an S pole and an N pole alternately at equal intervals in a peripheral direction.

Figure 5:
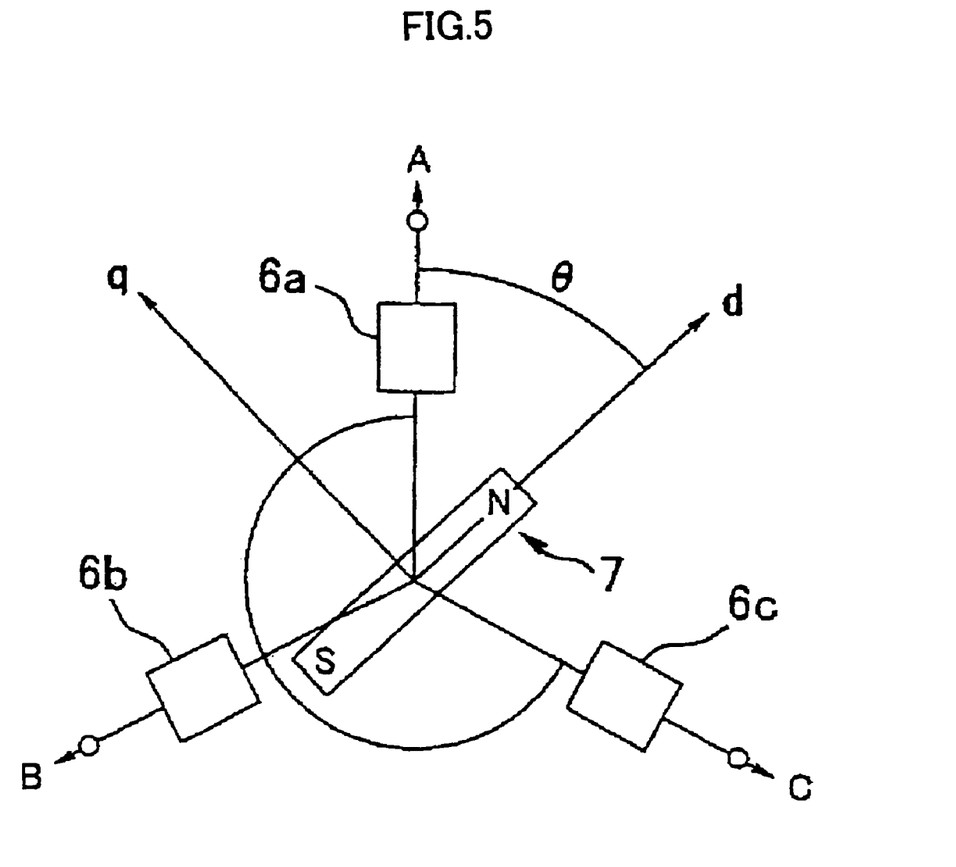
FIG. 5 is a diagram showing a principle of rotor position detection.

A support base plate 10, which is made of a ring-shaped thin plate, is disposed via a stay 9 on an end face on a side where the bearing 3b is disposed in the housing 2. A rotor position detector 11 such as a resolver or an encoder is fixed to this support base plate 10 so as to be opposed to the permanent magnet 8. Note that, as shown in FIG. 5, actually, plural rotor position detectors 11 are provided to be spaced apart from each other appropriately in the peripheral direction in association with drive timing of the excitation coils 6a to 6c. Here, the excitation coils 6a to 6c are disposed to surround an outer peripheral surface of the rotor 7 while being separated from each other by 120 degrees in an electrical angle. All coil resistances of the respective excitation coils 6a to 6c are set to be equal.

The rotor position detector 11 is adapted to output a position detection signal according to a magnetic pole of the opposed permanent magnet 8. The rotor position detector 11 is adapted to detect a rotating position of the rotor 7 using a characteristic that the rotor position detector 11 changes according to the magnetic pole of the permanent magnet 8. In response to this rotating position, a vector control phase current command value calculating unit 20 described later drives to rotate the rotor 7 according to a two-phase excitation system for sequentially switching the excitation coils 6a to 6c phase by phase while feeding an electric current to two phases of the three-phase excitation coils 6a to 6c simultaneously.

Then, the drive control for the motor 1 is performed using a rectangular wave current or a pseudo-rectangular wave current as a motor current or using a rectangular wave voltage or a pseudo-rectangular wave voltage as a motor induced voltage.

Here, the drive of the motor 1 is controlled according to the rectangular wave current or the pseudo-rectangular wave current or according to the rectangular wave voltage or the pseudo-rectangular wave voltage because, since the rectangular wave current or the rectangular wave voltage has a larger effective values compared with a sine wave current or a sine wave voltage if a current peak value or a voltage peak value is the same, it is possible to obtain a larger output value (power). As a result, when motors having the same performance are manufactured, there is an advantage that it is possible to realize a reduction in size of a motor when the rectangular wave current or the pseudo-rectangular wave current is used as a motor current or the rectangular wave voltage or the pseudo-rectangular wave voltage is used as a motor induced voltage. On the other hand, there is a disadvantage that it is difficult to reduce torque ripple according to control by the rectangular wave current or the pseudo-rectangular wave current or control by the rectangular wave voltage or the pseudo-rectangular wave voltage of the induced voltage compared with control by the sine wave current or the sine wave voltage.

Figure 6:
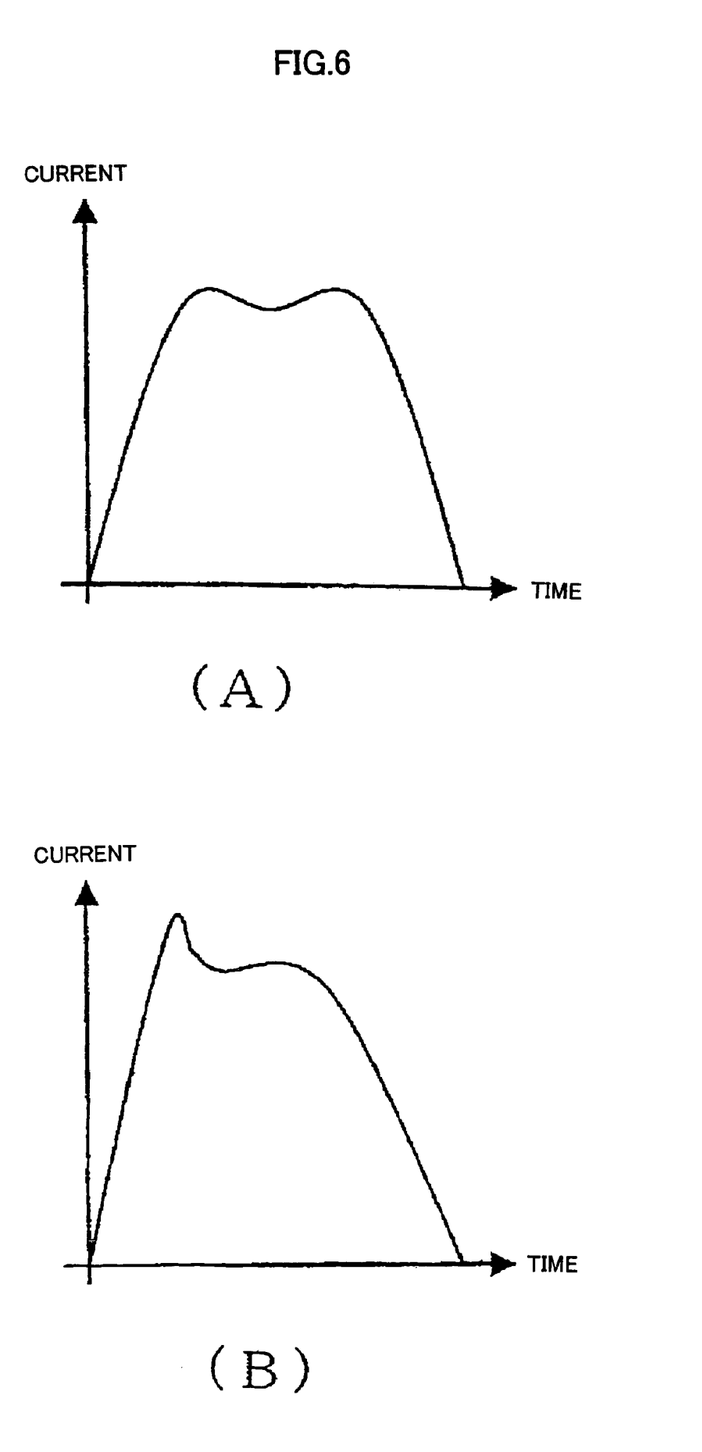
FIG. 6 is a graph concerning an explanation of a definition of a trapezoidal wave current (voltage).
Figure 7:
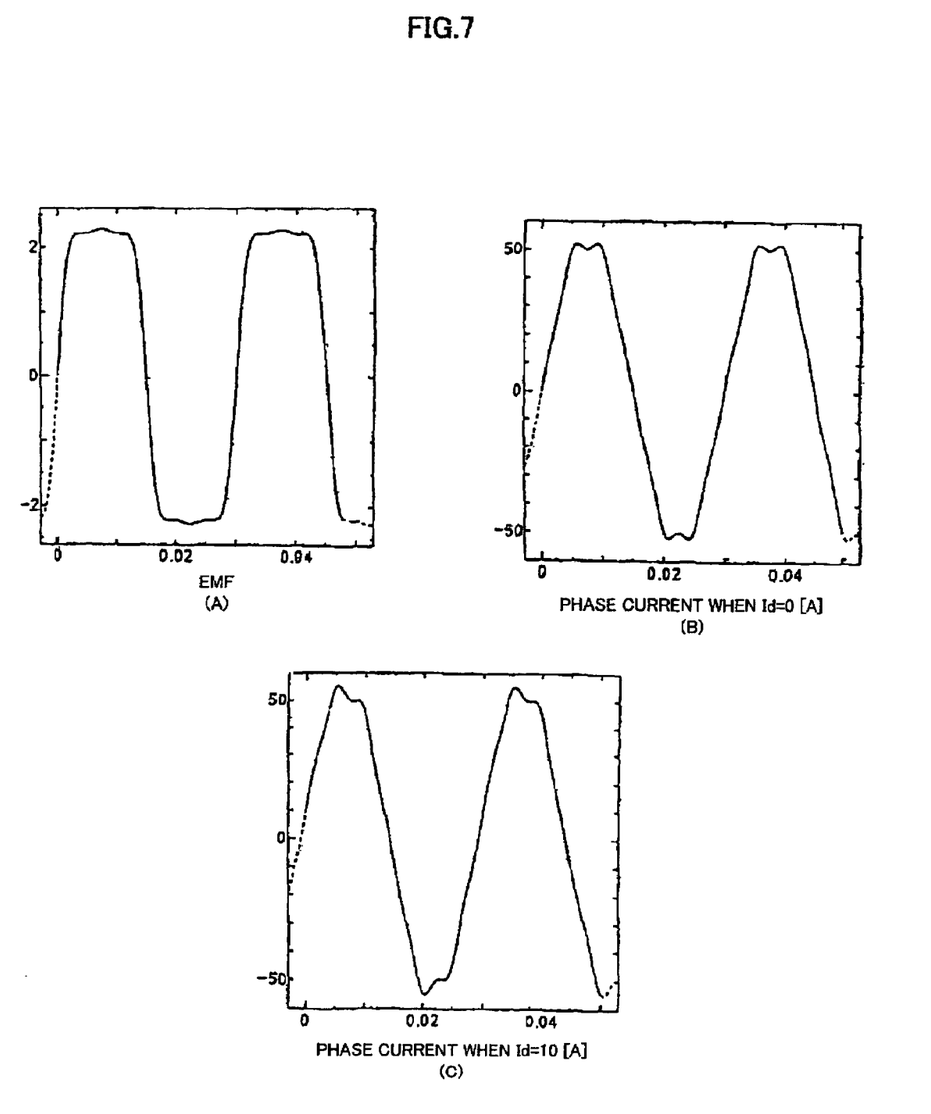
FIG. 7 is a graph showing an example of an induced voltage waveform (a rectangular waveform).

FIG. 6 shows an example of a motor current waveform that is controlled according to current (Id) control. FIG. 6(A) shows a motor current waveform in the case in which the motor 1 rotates at relatively low speed and there is no field-weakening control according to the current (Id) control (Idref=0). FIG. 6(B) shows a motor current waveform in the case in which the motor 1 rotates at high-speed and there is field-weakening control according to the current (Id) control. FIG. 6(A) is a motor current waveform and a waveform of an induced voltage corresponding to the motor current waveform is rectangular (trapezoidal) as shown in FIG. 7(A). An actual current waveform at the time of Id=0 is as shown in FIG. 7(B) (corresponding to FIG. 6(A)) as opposed to the waveform of the induced voltage in FIG. 7(A). An actual current waveform at the time when Id=10[A] is as shown in FIG. 7(C) (corresponding to FIG. 6(B)) as opposed to the waveform of the induced voltage in FIG. 7(A). Unlike a complete rectangular wave (a trapezoidal wave), the rectangular wave current or the rectangular wave voltage referred to in the invention includes a waveform having a recessed portion as shown in FIG. 6(A) or FIG. 7(B) or a waveform having a peak as shown in FIG. 6(B) or FIG. 7(C) or a current waveform (a pseudo-rectangular wave current) or a voltage waveform (a pseudo-rectangular wave voltage) shown in FIG. 7(A).

The motor according to the invention is driven by an electric current or a voltage of n-th (=second, third, fourth, . . . ) harmonics. A frequency of the n-th order is equal to or lower than an upper limit value (e.g., 1000 Hz) of a response frequency of current control. In other words, when an induced voltage waveform of the motor is a rectangular wave or a pseudo-rectangular wave and an order wave component at the time when the rectangular waveform or the pseudo-rectangular waveform is subjected to frequency analysis is assumed to be n (=2, 3, 4, . . . ), the order wave component n equal to or larger than 5% of an amplitude component is represented by the following expression (3):

$$n \times P/2 \times \omega \leq \text{an upper limit value of a response frequency of current control} \quad (3)$$

where P is the number of poles and ω is the number of actual rotation.

In this case, an angle sensor is provided such that a current waveform is provided at least as a function of the induced voltage waveform of the rectangular wave or the pseudo-rectangular wave. An electric time constant of motor correlation may be set to a control period or more or an angle estimating unit may be provided to give a motor current waveform at an estimated angle from this angle estimating unit.

A reason for setting the order wave component n equal to or larger than 5% of an amplitude component according to expression (3) is as described below. When the order wave component n, to which the current control unit cannot respond, is on a current command value, the order wave component n appears as torque ripple of the motor. It is known that, if the torque ripple of the motor is within 10%, the torque ripple is controlled by a torque control system so as not to be felt on a wheel (e.g., U.S. Pat. No. 3,298,006 (B2)). Therefore, it is possible to determine a harmonic content of a counter-electromotive force such that the torque ripple is 10% or less in a current value (torque). A relation between the counter-electromotive force and the harmonic content included in the current cannot be found uniquely according to a form of vector control (or pseudo-vector control). However, it has been found experimentally that the torque ripple is 10% or less in a current value (torque) if the harmonic content is 5% or less of the amplitude component.

In the electric power steering, usually, PWM control of 20 KHz is performed. However, when a frequency is lower than 20 KHz, a problem of motor noise occurs and, when a frequency is higher than 20 KHz, a problem of electromagnetic radiation noise and heat generation occurs. This depends on performance of an FET serving as driving means. In the PWM control of 20 KHz, 1000 Hz, which is ¹/₂₀ of 20 KHz, is an upper limit value of a response frequency of the current control. In the PWM control of 40 KHz, 2000 Hz, which is ¹/₂₀ of 40 KHz, is an upper limit value of a response frequency of the current control.

Figure 8:
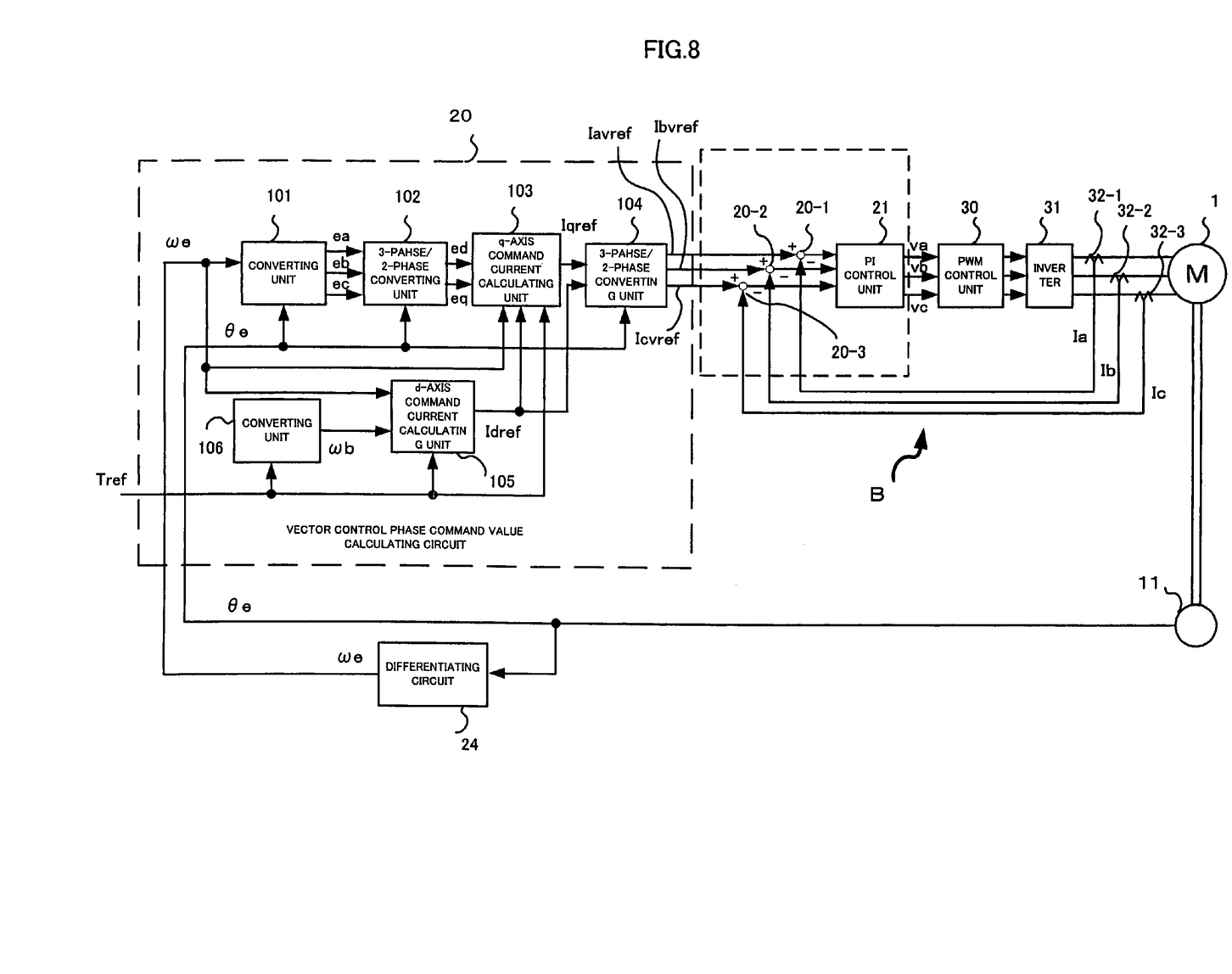
FIG. 8 is a block diagram showing an example of a control system of a brushless DC motor according to the invention.

In the invention, a motor drive control device shown in FIG. 8 is formed for the motor (with the number of poles P) having such characteristics. The motor drive control device of the invention includes a vector control phase current command value calculating unit 20, subtracting circuits 20-1, 20-2, and 20-3 that calculates respective phase current errors on the basis of phase current command values Iavref, Ibvref, and Icvref from the vector control phase current instruction value calculating unit 20 and motor phase currents Ia, Ib, and Ic from current detecting circuits 32-1, 32-2, and 32-3, and a PI control unit 21 that performs proportional integral control. Respective phase command currents are supplied from an inverter 31 to the motor 1 according to PWM control of the PWM control unit 30 to control rotation drive for the motor 1. An area A indicated by a broken line forms a current control unit.

In this embodiment, in the vector control phase current command value calculating unit 20, current command values of vector control d and q components are determined using an excellent characteristic of vector control and, then, the current command values are converted into respective phase current command value. The vector control phase command value calculating circuit 20 is closed with phase control rather than d and q control in a feedback control unit. Thus, since the theory of vector control is used at a stage of calculating a current command value, this control system is called pseudo-vector control (hereinafter referred to as "PVC control").

Note that the current control unit A in this embodiment includes the subtracting circuits 20-1, 20-2, and 20-3 that calculate respective phase current errors from the respective phase current command values Iavref, Ibvref, and Icvref and the motor phase currents Ia, Ib, and Ic of the motor 1 and the PI control unit 21 that inputs the respective phase current errors. In addition, the current detecting circuits 32-1, 32-2, and 32-3 are arranged as motor current detecting circuits between the inverter 31 and the motor 1 to form a feedback current B that supplies the respective phase currents Ia, Ib, and Ic of the motor detected by the current detecting circuits 32-1, 32-2, and 32-3 to the subtracting circuits 20-1, 20-2, and 20-3.

In addition, the vector control phase current command value calculating unit 20 includes a converting unit 101 serving as a counter-electromotive force of each phase calculating unit, a three-phase/two-phase converting unit 102 serving as a d-axis and q-axis voltage calculating unit, a q-axis command current calculating unit 103 that calculates a current command value Iqref on a q-axis, a two-phase/three-phase converting unit 104 serving as an each-current command calculating unit, a d-axis command current calculating unit 105 that calculates a current command value Idref on a d-axis, and a converting unit 106 that converts a motor base angular velocity ωb from the torque command value Tref. The vector control phase current command value calculating unit 20 receives a rotor position detection signal, which consists of a rotation angle θe of the rotor 7 detected by a rotor position detector 11 such as a resolver and an electrical angular velocity we obtained by calculating the rotation angle θe in the differential circuit 24, and a torque command value Tref determined on the basis of a torque detected by a not-shown torque sensor and calculates a phase command value signal according to the vector control. The rotor position detector 11 has a function as an angle sensor and it is possible to replace the rotor position detector 11 with an angle estimating unit.

The torque command value Tref is inputted to the q-axis command current calculating unit 103, the converting unit 106, and the d-axis command current calculating unit 105. The rotation angle θe is inputted to the converting unit 101, the three-phase/two-phase converting unit 102, and the two-phase/three-phase converting unit 104. The electrical angular velocity we is inputted to the converting unit 101, the q-axis command current calculating unit 103, and the d-axis command current calculating unit 105.

In such a monitor drive control device using the PVC control, drive control for the motor 1 is performed as described below.

First, the vector control phase current command value calculating unit 20 inputs the rotation angle θe and the electrical angular velocity ωe of the rotor 7 to the converting unit 101 and calculates counter-electromotive forces ea, eb, and ec of respective phases on the basis of a conversion table stored in the converting unit 101. The counter-electromotive forces ea, eb, and ec are a rectangular wave or a pseudo-rectangular wave of an n-th harmonics. A frequency of the n-th harmonics is obtained by multiplying an electrical angular velocity of the motor by n. When an actual speed of the motor is assumed to be ω, an electrical angular velocity of the motor is represented by P/2×ω. Next, the three-phase/two-phase converting unit 102 serving as the d-q voltage calculating unit converts the counter-electromotive forces ea, eb, and ec into voltages ed and eq of d-axis and q-axis components on the basis of the following expressions (4) and (5).

$$\begin{bmatrix} ed \\ eq \end{bmatrix} = C1 \begin{bmatrix} ea \\ eb \\ ec \end{bmatrix} \quad (4)$$

$$C1 = \frac{2}{3}\begin{bmatrix} -\cos(\theta e) & -\cos(\theta e - 2\pi/3) & -\cos(\theta e + 2\pi/3) \\ \sin(\theta e) & \sin(\theta e - 2\pi/3) & \sin(\theta e + 2\pi/3) \end{bmatrix} \quad (5)$$

Next, a method of calculating the current command value Idref on the d-axis, which is an important point of the invention, will be explained.

The d-axis command current calculating unit 105 calculates the d-axis current command value Idref in accordance with the following expression (6) with the base angular velocity ωb from the converting unit 106, the electrical angular velocity ωe from the differentiating circuit 24, and the torque command value Tref from the torque sensor as inputs. Here, Kt is a torque coefficient and ωb is a motor base angular velocity. The converting unit 106 calculates the base angular velocity ωb with the torque command value Tref as an input.

$$Idref = -|Tref/Kt| \cdot \sin(a\cos(\omega b/\omega m)) \quad (6)$$

Concerning a term a cos(ωb/ωm) in expression (6), when rotating speed of the motor is not high, that is, when the mechanical angular velocity ωm of the motor 1 is lower than the base angular velocity ωb, since ωm<ωb, a cos(ωb/ωm)

=0. Thus, Idref=0. When the rotating speed of the motor is high, that is, the mechanical angular velocity ωm is higher than the base angular velocity ωb, a value of the current command value Idref appears to start field-weakening control. As represented by expression (6), since the current command value Idref changes according to rotating speed of the motor 1, there is an excellent effect that it is possible to perform control at the time of high-speed rotation seamlessly and smoothly.

As another effect, there is also an effect concerning a problem of saturation of a motor terminal voltage. In general, a motor phase voltage V is represented by the following expression.

$$V=E+R \cdot I+L(di/dt) \quad (7)$$

Here, E is a counter-electromotive force, R is a fixed resistance, and L is an inductance. The counter-electromotive force E increases as the motor rotates at higher speed. A power supply voltage such as a battery voltage is fixed. Thus, a range of a voltage, which can be used for control of the motor, is narrowed. An angular velocity reaching voltage saturation is the base angular velocity ωb. When the voltage saturation occurs, a duty ratio of the PWM control reaches 100%. A motor current cannot follow a current command value any more. As a result, torque ripple increases.

However, the current command value Idref represented by expression (6) has a negative polarity and an induced voltage component of the current command value Idref concerning L(di/dt) of expression (7) has a polarity opposite to that of the counter-electromotive force E. Thus, there is an effect that the counter-electromotive force E, which increases as the motor rotates at higher speed, is reduced by a voltage induced by the current command value Idref. As a result, even if the motor 1 rotates at high speed, the range of a voltage, which can control the motor, is increased by the effect of the current command value Idref. In other words, there is an effect that a control voltage for the motor is not saturated by the field-weakening control according to the control for the current command value Idref, the range of a voltage, which can control the motor, is increased, and torque ripple is prevented from increasing even at the time when the motor rotates at high speed.

Figure 9:
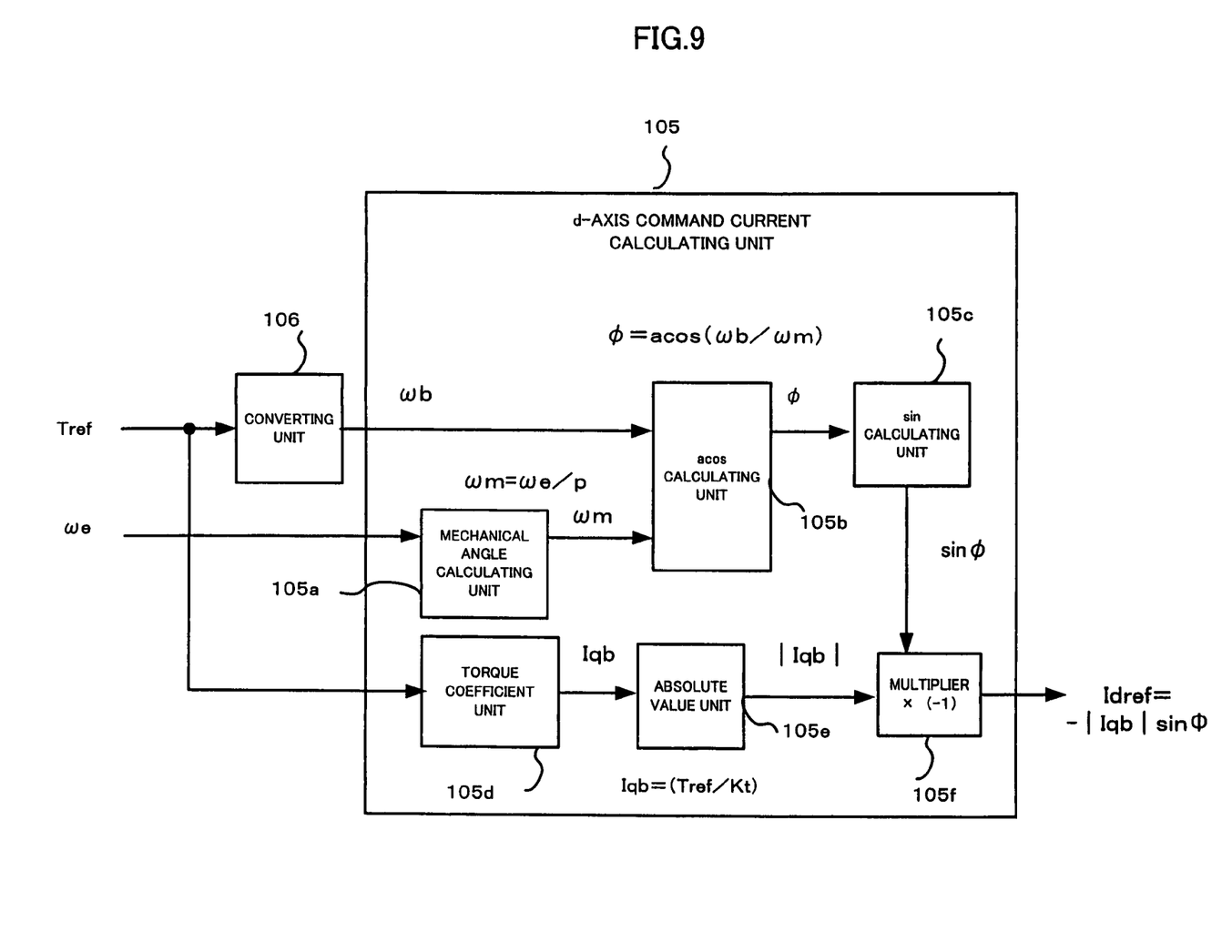
FIG. 9 is a block diagram showing an example of a structure for calculation of a current command value Idref according to field-weakening control of the invention.

FIG. 9 shows a block diagram of a circuit system concerning calculation of the current command value Idref. In FIG. 9, the torque command value Tref is inputted to the converting unit 106 and a torque coefficient unit 105d. The motor electrical angular velocity ωe is inputted to the mechanical angle calculating unit 105a. The mechanical angle calculating unit 105a calculates a motor mechanical angular velocity ωm(=ωe/P) from the motor electrical angular velocity ωe and inputs the mechanical angular velocity in an a cos calculating unit 105b. The converting unit 106 converts the torque command value Tref into the base angular velocity ωb and inputs the base angular velocity ωb to the a cos calculating unit 105b. The torque coefficient unit 105d converts the torque command value Tref into a coefficient Iqb(=Tref/Kt) and inputs the coefficient to an absolute value unit 105e. An a cos calculating unit 105b calculates an advance angle Φ=a cos(ωb/ωm) on the basis of the inputted mechanical angular velocity ωm and base angular velocity ωb and inputs the advance angle to a sin calculating unit 105c. The sin calculating unit 105c calculates sin Φ from the inputted advance angle Φ and inputs sin Φ to a multiplier 105f for multiplying a value by −1. The multiplier 105f multiplies the advance angle Φ from the sin calculating unit 105c by an absolute value |Iqb| from an absolute value unit 105e and multiplies a result of the multiplication by −1 to obtain the current command value Idref The current command value Idef is calculated according to expression (8) and is set as an output of the d-axis command current calculating unit 105.

$$Idref=-|Iqb| \times \sin(a\cos(\omega b/\omega m)) \quad (8)$$

The current command value Idref calculated in accordance with expression (8) is inputted to the q-axis command current calculating unit 103 and the two-phase/three-phase converting unit 104.

On the other hand, the q-axis command current calculating unit 103 calculates the current command value Iqref on the q-axis on the basis of the two-phase voltages ed and eq, the electrical angular velocity ωe(=ωm×P), and the current command value Idref on the d-axis according to a motor output equation indicated by the following expressions (9) and (10).

$$Tref \times \Phi m = 3/2(ed \times Id + eq \times Iq) \quad (9)$$

Therefore, when Id=Idref and Iq=Iqref are substituted in expression (9), $$Iqref=2/3(Tref \times m-ed \times Idref)/eq \quad (10)$$

In addition, a value calculated in expression (8) only has to be substituted in the current command value Idref.

As indicated by expression (10), since the current command value Iqref is derived from a motor output equation, which indicates that an output of a motor is equivalent to electric power, it is possible to easily calculate the current command value Iqref. In addition, it is possible to calculate an optimum current command value Iqref balanced with the current command value Idref for obtaining the necessary command torque Tref. Therefore, a motor terminal voltage is not saturated even at the time when the motor is rotating at high speed and it is possible to perform control for minimizing torque ripple.

FIG. 10(A) illustrates a relation between the current command values Idref and Iqref in the invention described above. FIG. 10(B) shows a relation in the case of the conventional advance angle control system.

The current command values Idref and Iqref are inputted to the two-phase/three-phase converting unit 104 serving as the each-phase current command value calculating unit and converted into the phase current command values Iavref, Ibvref, and Icvref of the respective phases. The current command values Idref and Iqref and the phase current command values Iavref, Ibvref, and Icvref are represented like expressions (12) and (13). Here, a subscript, for example, "avref" of the phase current command value Iavref represents a phase current command value of an a-phase determined by the vector control. Note that, as indicated by expression (13), a determinant C2 is a constant that is determined by the motor rotating angle θe.

$$\begin{bmatrix} Iavref \\ Ibvref \\ Icvref \end{bmatrix} = C2 \begin{bmatrix} Idref \\ Iqref \end{bmatrix} \quad (12)$$

$$C2 = \begin{bmatrix} -\cos(\theta e) & \sin(\theta e) \\ -\cos(\theta e - 2\pi/3) & \sin(\theta e - 2\pi/3) \\ -\cos(\theta e + 2\pi/3) & \sin(\theta e + 2\pi/3) \end{bmatrix} \quad (13)$$

Figure 1:
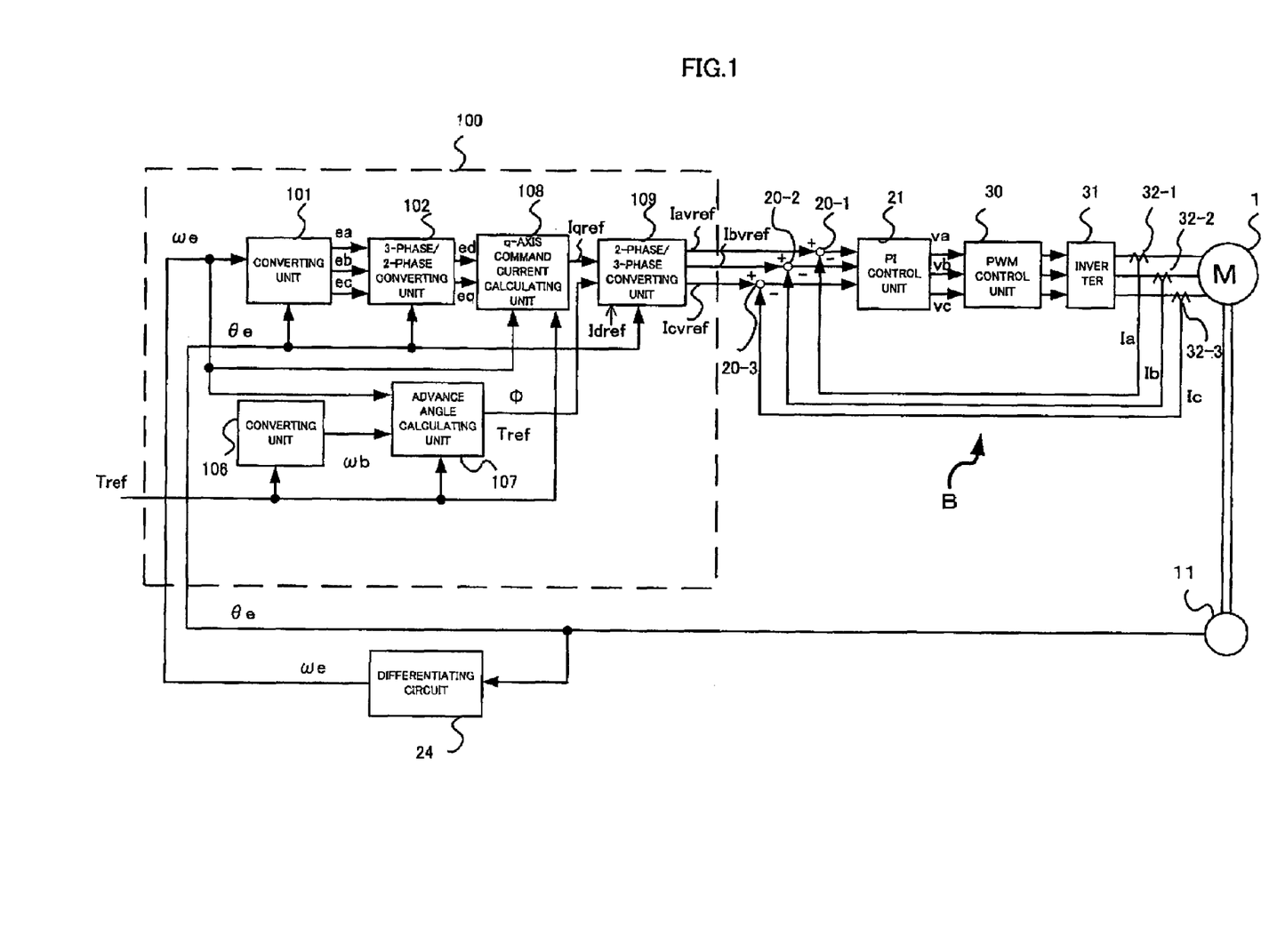
FIG. 1 is a control block diagram based on conventional advance angle control.

Conventionally, the two-phase/three-phase converting unit 109 in FIG. 1 calculates the phase current command values Iavref, Ibvref, and Icvref using the current command value Iqref and the advance angle Φ. In the invention, as described above, the two-phase/three-phase converting unit 104 calculates the phase current command values Iavref, Ibvref, and Icvref with the current command values Idref and Iqref as inputs. Then, the subtracting circuit 20-1, 20-2, and 20-3 subjects the respective phase currents Ia, Ib, and Ic of the motor detected by the current detecting circuits 32-1, 32-2, and 32-3 and the phase current command values Iavref, Ibvref, and Icvref to calculate respective errors. Next, the PI control unit 21 controls the errors of the respective phase currents to calculate a command value for the inverter 31, that is, the voltage values va, vb, and vc representing duty of the PWM control unit 30. The PWM control unit 30 subjects the inverter 31 to the PWM control on the basis of the voltage values va, vb, and vc, whereby the motor 1 is driven and a desired torque is generated.

As explained above, in the motor and the drive control device for the motor of the invention, a motor terminal voltage is not saturated even at the time when the motor is rotating at high speed. Thus, control for minimizing torque ripple is possible. Therefore, when the invention is applied to an electric power steering device, it is possible to execute rapid wheel steering smoothly. Thus, there is an excellent effect that a driver is prevented from feeling a sense of incongruity due to vibration of a wheel or the like.

The invention is completely different from the feedback control according to the d and q control of the conventional technique in that feedback control is executed according to only control of the respective phases. As a result, whereas, in the conventional technique, there is a problem in that a nonlinear element caused in the a-phase disperses to the respective phases b and c in a process of executing the conventional feedback control according to the d and q control and correction control cannot be performed correctly, in the invention, since a nonlinear element of the a-phase is subjected to the feedback control only in the a-phase and is not distributed to the b-phase and the c-phase, correction control can be performed correctly.

By using such PVC control, it is possible to control a motor in a state in which a nonlinear element included in control is separated into respective phases. As a result, it is possible to realize motor control with reduced torque ripple and reduced noise. Therefore, when the invention is applied to an electric power steering device, it is possible to perform smooth wheel operation with reduced noise and reduced vibration at the time of parking and in emergency steering.

Note that, although the phase voltages ea, eb, and ec are used in the embodiment, the same effect is obtained when the phase voltages are converted into line voltages eab, ebc, and eca, or the like to control the motor.

As described above, according to the motor of invention, there is an effect that a motor terminal voltage is not saturated even at the time when the motor is rotating at high speed, torque rippled is reduced, and motor noise is reduced. Moreover, in the electric power steering device of the invention, there is an excellent effect that it is possible to provide an electric power steering device that follows rapid steering of a wheel smoothly, does not cause a sense of incongruity in wheel operation, and has reduced noise.

In addition, according to the electric power steering device according to the invention, respective phase current command values are calculated on the basis of the vector control, and the PVC control for controlling respective phases separately is used as current feedback control. Thus, it is possible to provide a motor drive control device that can control the brushless DC motor to be small, have reduced torque ripple, and have reduced motor noise. It is possible to provide an electric power steering system with which wheel operation is smooth and noise is reduced.

Moreover, according to the motor of the invention, a frequency of n-th harmonics is equal to or lower than an upper limit value of a response frequency of current control. Thus, even if the motor is driven with a rectangular wave current or a pseudo-rectangular wave current or driven with a rectangular wave voltage or a pseudo-rectangular wave voltage, the motor has reduced torque ripple, a reduced size, and reduced noise.

INDUSTRIAL APPLICABILITY

According to the invention, a motor terminal voltage is not saturated even at the time when a motor is rotating at high speed, toque ripple is reduced, and motor noise is reduced. Thus, if the invention is applied to an electric power steering apparatus, it is possible to provide an electric power steering apparatus that follows rapid steering of a wheel smoothly, does not cause a sense of incongruity in wheel operation, and has reduced noise.

According to the electric power steering apparatus in the invention, respective phase current instruction values are calculated on the basis of the vector control, and the PVC control for controlling respective phases separately is used as current feedback control. Thus, it is possible to provide a motor drive control device that can control the brushless DC motor to be small, have reduced torque ripple, and have reduced motor noise. It is possible to provide an electric power steering system with which wheel operation is smooth and noise is reduced.

The invention claimed is:

1. A motor drive control device that controls a motor having three or more phases, comprising:
    a d-q voltage calculating unit that calculates a voltage ed which is a d-axis component of a counter-electromotive force, and a voltage eq which is a q-axis component of the counter-electromotive force;
    a q-axis command current calculating unit that calculates a current command value Iqref, which is a q-axis component of a current command value, on the basis of the voltage ed and the voltage eq;
    a d-axis command current calculating unit that calculates a current command value Idref that is a d-axis component of the current command value;
    a phase current command value calculating unit that calculates phase current command values of the respective phases on the basis of the current command values Iqref and Idref;
    a motor current detecting circuit that detects motor phase currents of the respective phases of the motor; and
    a current control unit that controls phase currents of the respective phases of the motor on the basis of the phase current command values and the detected motor phase currents;
    wherein differences between the phase current command values and the detected motor phase currents are inputted to the current control unit.

2. A motor drive control device according to claim 1, wherein, when the motor has three phases, phase current command values Iavref, Ibvref, and Icvref are calculated according to a constant depending on the current command values Idref and Iqref and a rotation angle of the motor.

3. A motor drive control device according to claim 1, wherein the current control unit includes integral control.

4. A motor drive control device according to any one of claims 1 to 3, wherein the motor is a brushless DC motor.

5. A motor drive control device according to any one of claims 1 to 3, wherein a waveform of a current or an induced voltage of the motor is a rectangular wave or a pseudo-rectangular wave.

6. A motor drive control device according to claim 4, wherein a waveform of a current or an induced voltage of the motor is a rectangular wave or a pseudo-rectangular wave.

7. An electric power steering apparatus, wherein the motor drive control device according to any one of claims 1 to 3 is provided.

8. An electric power steering apparatus, wherein the motor drive control device according to claim 4 is provided.

9. An electric power steering apparatus, wherein the motor drive control device according to claim 5 is provided.

10. An electric power steering apparatus, wherein the motor drive control device according to claim 6 is provided.

* * * * *